United States Patent [19]
Walter

[11] Patent Number: 5,987,428
[45] Date of Patent: Nov. 16, 1999

[54] METHOD AND APPARATUS FOR CHECKING OUT NON-BARCODED ITEMS AT A CHECKOUT STATION

[75] Inventor: Joanne S. Walter, Alpharetta, Ga.

[73] Assignee: NCR Corporation, Dayton, Ohio

[21] Appl. No.: 08/673,641

[22] Filed: Jun. 25, 1996

[51] Int. Cl.[6] .................................................. G06F 17/60
[52] U.S. Cl. .................. 705/23; 177/25.15; 186/61; 235/383; 705/16; 705/20
[58] Field of Search ................... 177/25.15; 186/61; 235/383; 705/1, 16, 20, 23, 414

[56] References Cited

U.S. PATENT DOCUMENTS

| | | | |
|---|---|---|---|
| 4,676,343 | 6/1987 | Humble et al. | 186/61 |
| 4,881,606 | 11/1989 | Halfon et al. | 177/126 |
| 4,964,053 | 10/1990 | Humble | 364/466 |
| 5,115,888 | 5/1992 | Schneider | 186/61 |
| 5,139,100 | 8/1992 | Brauneis | 177/25.15 |
| 5,174,399 | 12/1992 | Brauneis | 177/25.15 |
| 5,398,191 | 3/1995 | Komai | 364/466 |
| 5,410,108 | 4/1995 | Williams et al. | 177/25.15 |
| 5,426,282 | 6/1995 | Humble | 235/383 |

*Primary Examiner*—Edward R. Cosimano
*Attorney, Agent, or Firm*—Maginot, Addison & Moore

[57] ABSTRACT

A method and apparatus for checking out an item to be weighed through a checkout station. The method includes the steps of sensing when the item is positioned on a scale, and displaying a visual indication which prompts a user to initiate a specific keystroke operation in response to the sensing step. The visual indication may be an item menu or a highlighted portion of a screen display. The item menu may include a listing of item names which are ranked based on a sales volume value associated with each of the item names listed in the item menu.

10 Claims, 7 Drawing Sheets

| | | | |
|---|---|---|---|
| 1. | RED DELICIOUS APPLES | 9. | GREEN GRAPES |
| 2. | FLORIDA ORANGES | 10. | RED GRAPES |
| 3. | GRANNY SMITH APPLES | 11. | CABBAGE |
| 4. | BANANAS | 12. | PLUMS |
| 5. | LEAF LETTUCE | 13. | SWEET POTATOES |
| 6. | BAKING POTATOES | 14. | BLUEBERRIES |
| 7. | WATERMELON | 15. | TURNIPS |
| 8. | BING CHERRIES | 16. | OTHER |

| | | | |
|---|---|---|---|
| 1. | BULK OATMEAL | 9. | BOCK CHOI |
| 2. | CHINESE PEAPODS | 10. | GINGER ROOT |
| 3. | BULK SUNFLOWER SEEDS | 11. | BULK SWEET TARTS |
| 4. | PAPAYAS | 12. | BULK LICORICE |
| 5. | PARSNIPS | 13. | RASPBERRIES |
| 6. | ASPARAGUS | 14. | BULK COOKIES |
| 7. | BULK COCOA POWDER | 15. | ACORN SQUASH |
| 8. | BULK PEANUTS | 16. | OTHER |

METHOD AND APPARATUS FOR CHECKING OUT NON-BARCODED ITEMS AT A CHECKOUT STATION

BACKGROUND OF THE INVENTION

The present invention relates generally to checkout or point-of-sale (POS) stations, and more particularly to a method and apparatus for checking out non-barcoded items at a self-checkout station or an assisted checkout station.

In the retail industry, the largest expenditures are typically the cost of the goods sold followed closely by the cost of labor expended. With particular regard to the retail grocery or supermarket industry, the impetus to reduce labor costs has been focused on reducing or eliminating the amount of time required for a cashier or checkout clerk to handle and/or process the goods to be purchased by a customer. To this end, there have been a number of improvements to speed-up the checkout procedure through an assisted checkout station. In addition, a number of self-checkout station concepts have been developed which substantially eliminate the need for a checkout clerk.

One improvement which has had a large impact on reducing the amount of time required to process items through an assisted checkout station or a self-checkout station is the use of optical scanning equipment such as scanners or bar code readers. Unfortunately, there are a fair number of items available in a grocery store that do not have a bar code such as a universal product code (UPC) associated therewith. Generally, those items not having a bar code associated therewith, are items whose price is based upon a weight of the item. Examples of such items include bulk foods, store prepared foods and produce such as fruits and vegetables which are typically sold based on a weight of the item(s) to be purchased. The trend in the supermarket industry has been to determine the weight of an un-scannable item at a checkout station during the checkout process by using a weight scale (typically associated with a slot scanner device). What is meant herein by the use of the term "un-scannable" item is an item whose price is determined based upon the weight of the item.

In order to "key-in" or otherwise process an un-scannable item, a checkout clerk (in an assisted checkout station) or a customer (in a self-checkout station) must place the un-scannable item on the weight scale and then perform a checkout procedure for the un-scannable item which may involve of one or more keystroke operations. In particular, an initial keystroke may be required in order to cause the weight of the un-scannable item resting on the weight scale to be determined. One or more additional keystrokes may then be required to identify the un-scannable item resting on the weight scale by entering or otherwise selecting a product look-up (PLU) code via a data input device associated with the checkout station.

Once the item has been weighed and properly identified, a processing unit associated the checkout station determines a price for the item based in part on the weight of the item. In particular, the weight of the item, as determined by the weight scale, is multiplied by a cost code (typically expressed as a price per unit of weight) associated with the PLU code. Such cost codes are stored in or transmitted to the processing unit associated with the checkout station during the checkout process.

One problem with known self-checkout and assisted checkout solutions is that the customer or checkout clerk is not prompted as to what keystroke operation(s) must be performed in order to properly checkout the un-scannable item. One solution, as described in U.S. patent application Ser. No. 08/602,483, filed Feb., 20, 1996 and assigned to the same assignee of the present invention, has been to provide a visual indicator which prompts a user to verbally announce the name of the un-scannable item so that voice recognition software associated with a checkout station may then identify the price of the un-scannable item and enter the price into a checkout transaction. It should be appreciated that with a voice recognition module, voice synthesis module, and voice recording module associated therewith, the known checkout station solution may be cost prohibitive in some applications.

Thus, what is needed therefore is a cost effective solution which prompts a user to initiate a specific procedure (e.g. keystroke operation) for checking out an un-scannable item. Such a prompt would increase the productivity of the user and/or the checkout station. In the case of a checkout clerk or customer which is familiar with the specific procedure for checking out an un-scannable item. productivity is increased because of the reduced amount of time that it takes for the checkout clerk or customer to initiate the procedure. For instance, the thought process required to initiate a proper keystroke operation is reduced by prompting the checkout clerk or customer as to the proper keystroke operation that should be performed. It should be appreciated that the increased productivity benefits which are realized by prompting a user familiar with a specific checkout procedure for an un-scannable item, are even greater when prompting a user which is not familiar with the checkout procedure for un-scannable items.

SUMMARY OF THE INVENTION

In accordance with one embodiment of the present invention, there is provided a method for checking out an item through a checkout station. The method includes the steps of sensing when the item is positioned on a scale, and displaying a visual indicator which prompts a user to initiate a specific keystroke operation in response to the sensing step.

Pursuant to another embodiment of the present invention, there is provided a checkout station including a scale, and a mechanism for providing a visual indicator which prompts a user to initiate a keystroke operation in response to an item being placed on the scale.

It is therefore an object of the present invention to provide a new and useful method for checking out an item to be weighed through a checkout station.

It is another object of the present invention to provide an improved method for checking out an item to be weighed through a checkout station.

It is another object of the present invention to provide a new and useful checkout station.

It is another object of the present invention to provide an improved checkout station.

It is a further object of the present invention to provide a method and apparatus for increasing the productivity of a checkout clerk and/or a self-service checkout station or an assisted checkout station.

It is yet another object of this invention to provide a method and apparatus for reducing the amount of time and/or keystrokes necessary to checkout an item to be weighed at a self-service checkout station or an assisted checkout station.

The above and other objects, features, and advantages of the present invention will become apparent from the following description and the attached drawings.

DETAILED DESCRIPTION OF THE PREFERRED EMBODIMENT

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
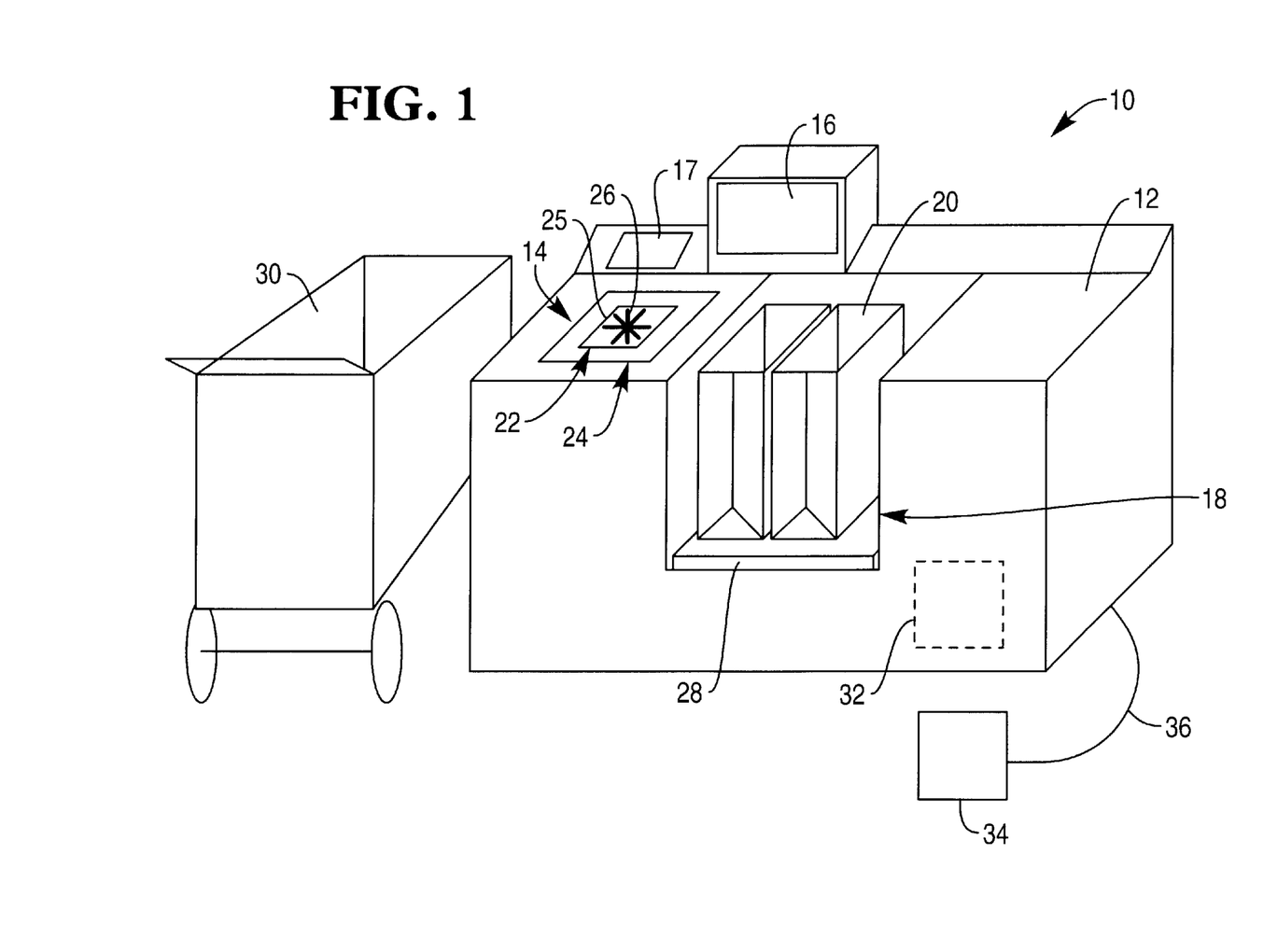
FIG. 1 is a perspective view of an exemplary selfcheckout station which incorporates the features of the present invention therein.

Referring now to FIG. 1, there is shown an exemplary self-checkout station 10 for use in a retail business such as a grocery store. The self-checkout station 10 may include a counter 12, a combined scanner/scale device 14, a display monitor 16, a data entry device 17 such as a key pad or keyboard, and a recess 18 for accommodating grocery bags 20 such as suspended plastic bags or upstanding paper bags.

The combined scanner/scale device 14 includes a slot scanner portion 22 and a scale portion 24. The scale portion 24 typically includes a top plate 25 on which an item to be weighed is placed. The slot scanner portion 22 conventionally scans or reads a code such as a bar code (e.g. Universal Product Code (UPC)), industrial symbols, alphanumeric characters, or other indicia associated with an item to be purchased. It should be appreciated that the scale portion 24 and the slot scanner portion 22 may be separate and independent devices if so desired.

The slot scanner portion 22 typically includes a light source (not shown) such as a laser, a rotating mirror (not shown) driven by a motor (not shown), and a mirror array (not shown). In operation, the laser beam reflects off the rotating mirror and mirror array to produce a pattern of scanning light beams. As a bar code or other indicia on the item is passed over an aperture or window 26 of the slot scanner portion 22, the scanning light beams scatter off the bar code, and are returned to the slot scanner portion 22 where they are collected and detected. The reflected light is then analyzed electronically to determine whether the light contains a valid bar code pattern. If so, the bar code or other indicia is then converted into product identification and pricing information which may then be used to determine the cost of the item in a known manner.

The recess 18 may also accommodate a known scale device 28 for weighing the contents of the grocery bags 20 as a security check. That is, the weight of each item scanned by the scanner/scale device 14 may be summed together and checked against the weight of the contents within one or more grocery bags 20 to insure that each item within the grocery bags 20 was in fact scanned.

As described in further detail below, a customer individually removes an item from a grocery cart or trolley 30 and passes the item over the scanner portion 22. If the scanner portion 22 successfully scans or reads the code associate with the item, an audio or visual indication is generated and the customer then places the item within a grocery bag 20. If for any reason the scanner portion 22 cannot read or otherwise determine the code associated with the item, the customer can manually enter the code associated with the item directly into the checkout station 10 via the key pad 17.

In the case where an item does not have a code or other indicia associated therewith (e.g. items of produce), the customer initially places the un-scannable item on the top plate 25 of the scale portion 24. The presence of the un-scannable item on the scale portion 24 is detected, and a visual indication is thereafter automatically generated or otherwise provided which prompts the customer to initiate a specific procedure (e.g. keystroke operation) for checking out the un-scannable item. The visual indication may be in the form of a new screen that is displayed on the display monitor 16, or a highlighted portion of an existing screen that is displayed on the display monitor 16.

In particular, the customer may be prompted to select the item from an item menu displayed on the display monitor 16. Alternatively, the customer may be prompted to enter a PLU code for the item. In either case, once the item is selected, a local processing unit 32 may then determine the price for the item based on the weight of the item reported from the scale portion 24, and from a price per unit weight value for the item which is stored in the local processing unit 32. It should be appreciated that the processing unit may alternatively be a remote processing unit 34 which communicates with the checkout station 10 via a communication link 36.

Figure 2:
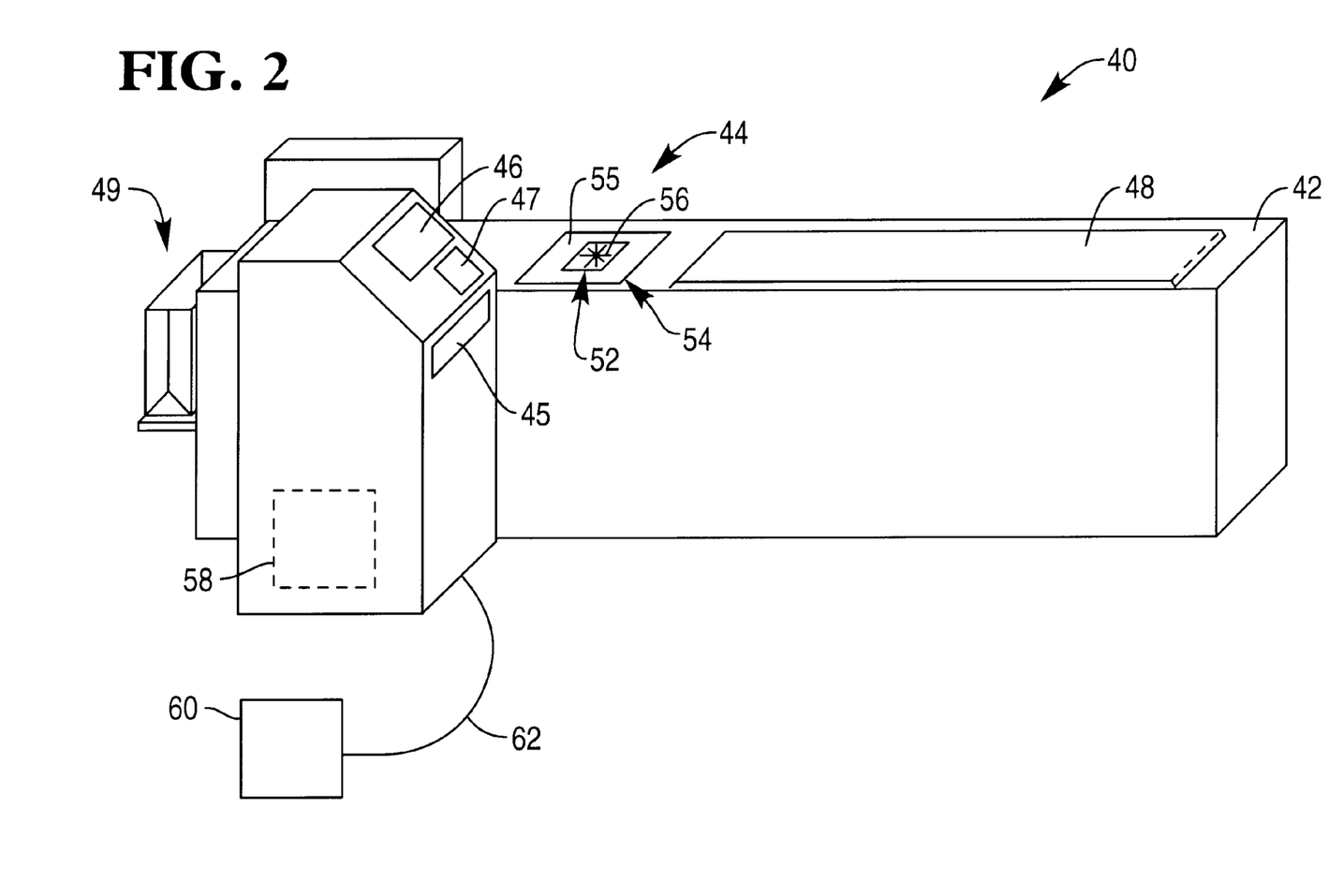
FIG. 2 is a perspective view of an exemplary assisted checkout station which incorporates the features of the present invention therein.

FIG. 2 shows an exemplary assisted checkout station 40. The assisted checkout station 40 may include a counter 42, combined scanner/scale device 44, cash drawer 45, display monitor 46, data entry device 47 such as a key pad or keyboard, a conveyor 48 for conveying items toward the scanner/scale device 44, and a bagging station 49. As with the scanner/scale device 14 (FIG. 1), the scanner/scale device 44 includes a slot scanner portion 52 and a scale portion 54. The scale portion 54 includes a top plate 55 on which an item to be weighed is placed, and the slot scanner portion 52 includes an aperture or window 56.

As described in further detail below, a customer removes an item from a grocery cart or trolley and places the item on the conveyor 48, which conveys the item toward the scanner/scale device 54. A checkout clerk may then retrieve the item from the conveyor and pass the item over the scanner portion 52. If the scanner portion 52 successfully scans or otherwise reads the code associate with the item, an audio or visual indication is generated and the checkout clerk forwards the item toward the bagging station 49. If for any reason the scanner portion 52 cannot read or otherwise determine the code associated with the item, the checkout clerk can manually enter the code associated with the item directly into the checkout station 40 via the key pad 47.

In the case where an item does not have a code or other indicia associated therewith (e.g. items of produce), the checkout clerk initially places the un-scannable item on the top plate 55 of the scale portion 54. The presence of the un-scannable item on the scale portion 54 is detected, and a visual indication is thereafter automatically generated or otherwise provided which prompts the checkout clerk to initiate a specific procedure (e.g. keystroke operation) for checking out the un-scannable item. The visual indication may be in the form of a new screen that is displayed on the display monitor 46, or a highlighted portion of an existing screen that is displayed on the display monitor 46.

In particular, the checkout clerk may be prompted to select the item from an item menu displayed on the display monitor 46. Alternatively, the checkout clerk may be prompted to enter a PLU code for the item. In either case, once the item is selected, a local processing unit 58 may determine the price for the item based on the weight of the item reported from the scale portion 54, and from a price per unit weight value for the item which is stored in the local processing unit 58. It should be appreciated that the processing unit may alternatively be a remote processing unit 60 which communicates with the checkout station 40 via a communication link 62.

Figure 3:
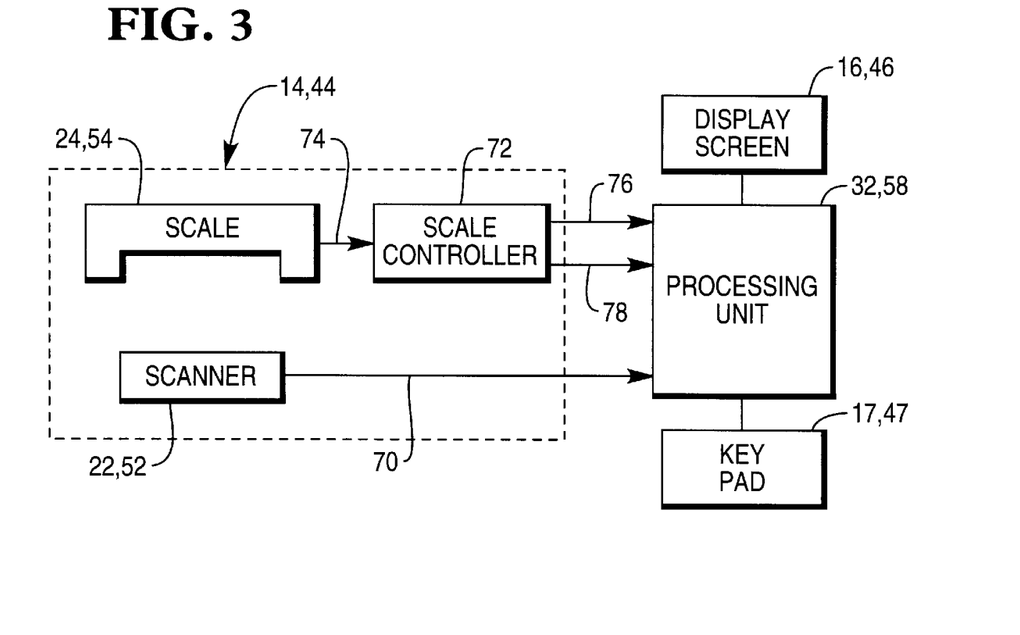
FIG. 3 is a block diagram of an integral scanner/scale device which may be associated with either of the checkout stations shown in FIGS. 1 and 2.

Referring now to FIG. 3, there is shown a block diagram of the integral scanner/scale device 14, 44 which may be connected to the processing unit 32, 58 of the checkout station 10, 40. Bar code information obtained from a scanned item is carried by a scan data connection 70 from the scanner portion 22, 52 to the processing unit 32, 58. Scale information is passed from the scale portion 24, 54 to a scale controller 72 via a scale data connection 74. The scale controller 72, in turn; passes weight information to the processing unit 32, 58 via a second scale data connection 76. The scale controller 72 also generates a trigger signal which is coupled to the processing unit 32, 58 via a trigger signal connection 78. The trigger signal on connection 78 is used by the processing unit 32, 58 to automatically generate a visual indication which prompts a user to initiate a specific procedure for checking out the un-scannable item presently resting on the scale portion 24, 54, as described further below.

In particular, when weight is applied to the scale portion 24, 54, the weight of the particular item resting thereon causes a mechanical deflection of load cells in load cell assemblies (not shown) associated with the scale portion 24, 54. The load cells generate a corresponding scale signal which is transferred over the scale data connection 74 to the scale controller 72. The scale controller 72 includes conventional electronics which (1) computes a weight of the item based on the scale signal generated by the load cells; (2) reports the weight of the item to the processing unit 32, 58 over connection 76; and (3) generates the trigger signal on connection 78 based on the scale signal generated by the load cells.

In response to the trigger signal received from the scale controller 72 on connection 78, the processing unit 32, 58 causes a visual indication to be generated which prompts a user to initiate a specific procedure for checking out the un-scannable item. The visual indication may be in the form of a new screen display such as an item menu that is automatically displayed on the display monitor 16, 46. The visual indication may also be a portion of an existing screen display that is automatically highlighted to prompt the user to initiate the specific checkout procedure. It should be appreciated that the scale controller 72 may be calibrated such that the trigger signal on connection 78 is generated only when a non-zero weight equal to or exceeding a predetermined minimum weight value is determined or computed from the scale signal on connection 74.

Figure 4:
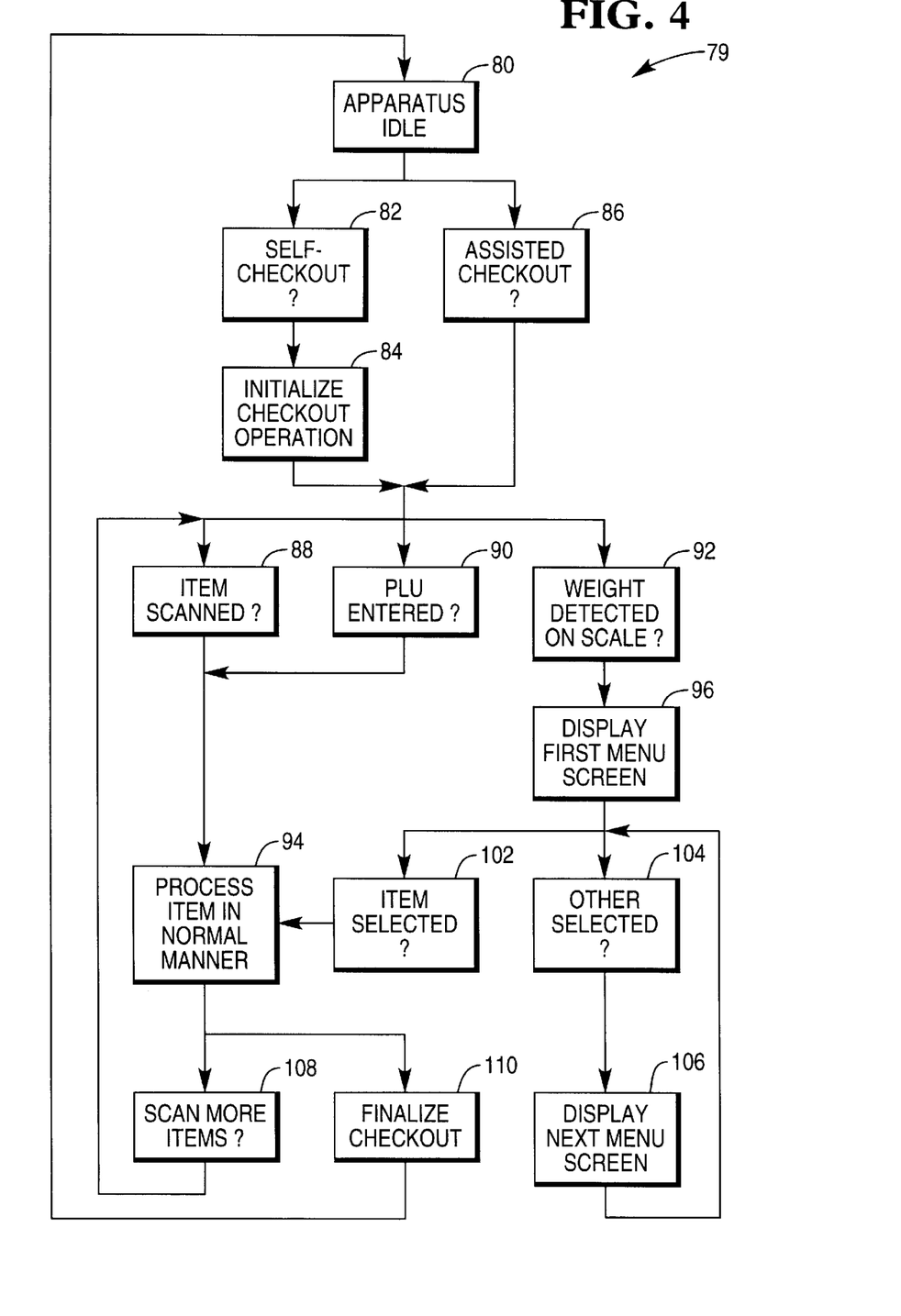
FIG. 4 is a flowchart showing a first embodiment of a procedure for checking out items at either of the checkout stations shown in FIGS. 1 and 2.

Referring now to FIG. 4, there is shown a flowchart which sets forth a first embodiment of a procedure 79 for checking out items through a checkout station wherein an item menu is automatically displayed on a display monitor when an item is detected on a weight scale. In particular, the automatic display of an item menu serves as a visual indicator or indication to prompt the user to initiate a specific checkout procedure for the item resting on the scale device. In this case, the specific checkout procedure requires the user to at least select the item resting on the scale device from one or more item menus as described in detail below. It should be appreciated that the procedure 79 may be implemented on either the self-checkout station 10 shown in FIG. 1, or the assisted checkout station 40 shown in FIG. 2

When a customer arrives at the checkout station 10, 40, the checkout station is in an idle state (block 80). If a self-checkout station has been selected by the customer (block 82), an initialization procedure (block 84) may be executed prior to checking out the items for purchase. In particular, one or more instructions may be displayed on the display monitor 16 of the self-checkout station 10 which, for instance, instruct the customer to identify himself or herself by inserting a shopping card into a slot (not shown) associated with the self-checkout station 10. If an assisted checkout station has been selected by the customer (block 86), a checkout clerk may directly begin checking out items for purchase without performing the initialization procedure (block 84).

In the case where an item to be purchased includes a bar code, the item is scanned (block 88) in a known manner as described above. In the case where the scanner portion 22, 52 is unable to scan or otherwise read the bar code associated with an item, a human-readable numeric product code that is associated with the bar code, or a PLU code may be manually entered via the key pad 17, 47 (block 90). Once the item has been successfully scanned, or the product code successfully entered, the processing unit 32, 58 determines the price of the item and performs an accounting thereof in a well known manner (block 94).

In the case where an item must be weighed in order to determine the price thereof (e.g. bulk items, produce items, etc.), the un-scannable item is placed on the scale portion 24, 54 (block 92). When the item is placed on the scale portion 24, 54, a trigger signal is sent to the processing unit 32, 58 and a visual indicator such as an item menu is automatically caused to be displayed (block 96) in a manner as described above with regard to FIG. 3.

Figure 5:
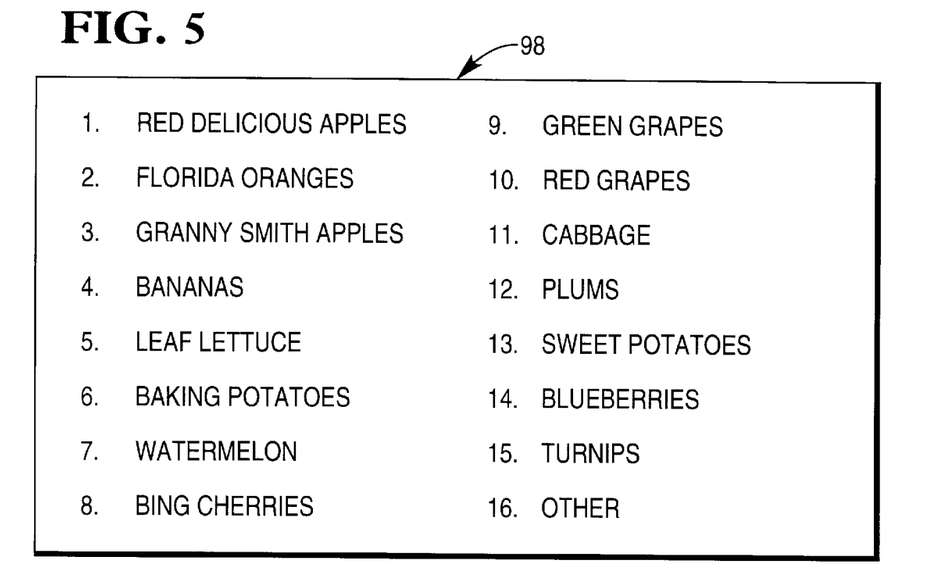
FIG. 5 illustrates a first embodiment of a screen display for the checkout procedure shown in FIG. 4.

Referring now to FIG. 5, there is shown an exemplary item menu 98 which may be displayed on the display monitor 16, 46 in response to detecting the weight of the un-scannable item resting on the scale portion 24, 54. The item menu 98 includes a numbered list of un-scannable items. By way of example, the item menu 98 lists fifteen un-scannable items each having an item number 1–15 associated therewith, and an "OTHER" selection having an item number 16 associated therewith. In a preferred embodiment, the un-scannable items that are listed in the item menu 98 are arranged or ranked based upon a volume of store sales attributed to the particular un-scannable items. That is, the un-scannable items having the greatest sales volume are assigned higher item numbers than un-scannable items having lower sales volumes. Thus, it should be appreciated that the item menu 98 may be arranged such that the un-scannable items listed thereon represent a large percentage (e.g. 80–90%) of a store's total sales volume for un-scannable items.

The OTHER selection 16 is made when an un-scannable item is not listed on the item menu 98. In such a case, one or more subsequent item menus (not shown) may then be displayed which list un-scannable items having sales volumes less than the un-scannable items listed on the initial item menu 98. It should be appreciated that the item menus may also include a RETURN selection (not shown) such that a user may scroll either forward or backward through the item menus.

Figure 6:
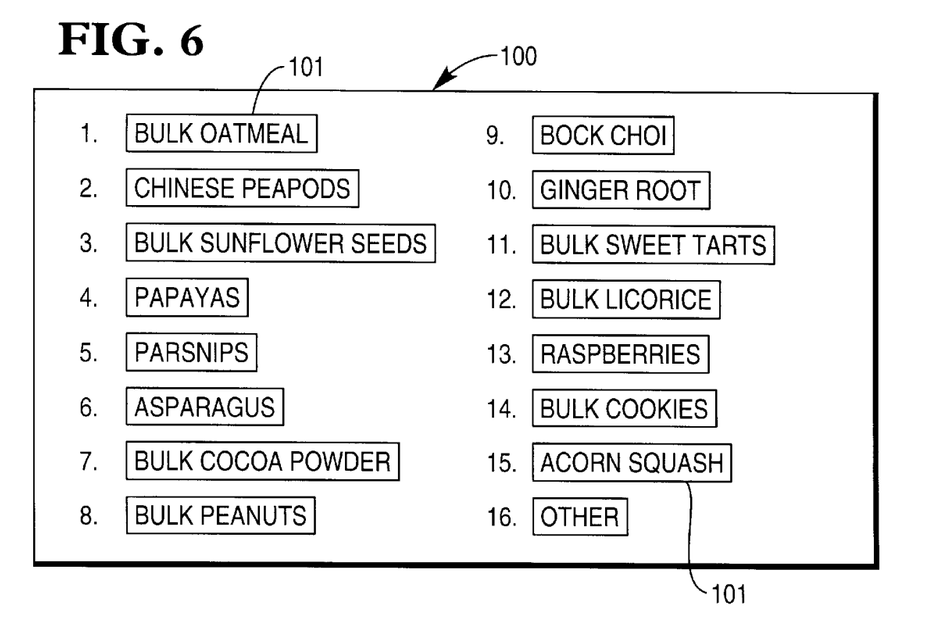
FIG. 6 illustrates a second embodiment of a screen display for the checkout procedure shown in FIG. 4.

With such an arrangement, it is more likely than not, that when an un-scannable item is placed on the scale portion 24, 54, a item listing for the particular un-scannable item will appear on the initial item menu 98. If the particular un-scannable item does appear on the item menu 98, the corresponding item number may be entered into the key pad 47 so as to identify to the checkout station 10, 40 the particular un-scannable item to be purchased. Alternatively, as shown in FIG. 6, each un-scannable item listed on an item menu 100 has a corresponding touch area 101 associated therewith, such that the item to be purchased may be selected by touching the designated area on the display monitor 16, 46 in a well-known manner.

Referring back to FIG. 4, if the particular un-scannable item to be purchased is selected from the item menu 98 (block 102), then the item is processed in a normal manner (block 94). If the particular un-scannable item to be purchased is not listed on the item menu 98, the OTHER selection may be selected (block 104) so that the next item menu (not shown) may be displayed on the display monitor 16, 46 (block 106). Once the item menu listing the particular un-scannable item for purchase is displayed and selected (block 102), the processing unit 32, 58 determines the price of the item and performs an accounting thereof in a well known manner (block 94).

After the item has been successfully processed (block 94), other items may be checked out (block 108), or if the item was the last item to be purchased, the checkout procedure may be finalized (block 110) by (1) totaling the cost of the items checked out; (2) crediting the total amount due for coupons, instant rebates, and the like; and/or (3) tendering payment, in a well known manner.

Figure 7:
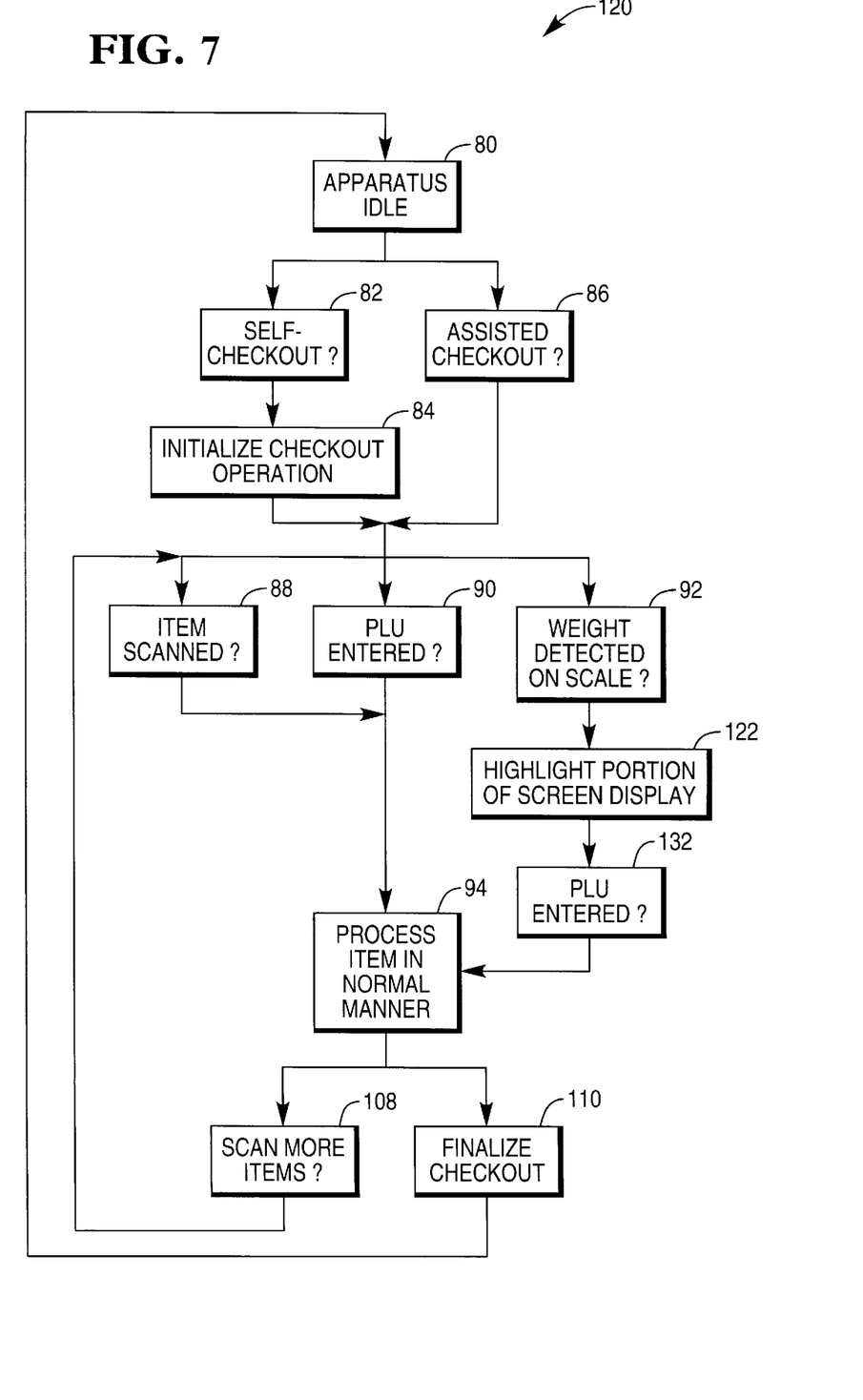
FIG. 7 is a flowchart showing a second embodiment of a procedure for checking out items at either of the checkout stations shown in FIGS. 1 and 2.

Referring now to FIG. 7, there is shown a flowchart which sets forth a second embodiment of a procedure 120 for checking out items through a checkout station wherein a portion of an existing screen display is automatically highlighted when an item is detected on a weight scale. In particular, the automatic highlighting of a portion of a screen display serves as a visual indicator to prompt the user to initiate a specific checkout procedure for the item resting on the scale device. In one case, the specific checkout procedure requires the user to at least enter a PLU code for the item resting on the scale device as described in detail below. It should be appreciated that the procedure 120 may be implemented on either the self-checkout station 10 shown in FIG. 1, or the assisted checkout station 40 shown in FIG. 2.

In FIG. 7, the same reference numerals are used to designate the same procedural steps shown in FIG. 4 which were discussed above, therefore, no further discussion thereof is warranted. The checkout procedure 120 proceeds in the same manner as the checkout procedure 79 (FIG. 4) until weight is detected on a scale device (block 92). That is, where an item must be weighed in order to determine the price thereof (erg. bulk items, produce items, etc.), the un-scannable item is placed on the scale portion 24, 54. When the item is placed on the scale portion 24, 54, a trigger signal is sent to the processing unit 32, 58 and a visual indicator such as a highlighted portion of a screen display is automatically caused to be generated (block 122) in a manner as described above with regard to FIG. 3.

Figure 8:
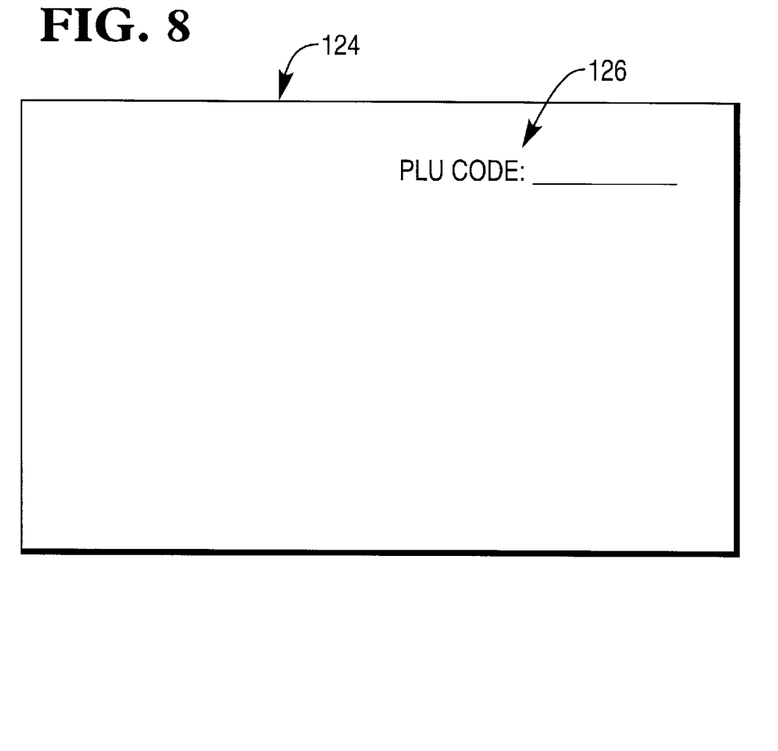
FIG. 8 illustrates a screen display for the checkout procedure shown in FIG. 7 prior to detecting the presence of an item on a scale device.
Figure 9:
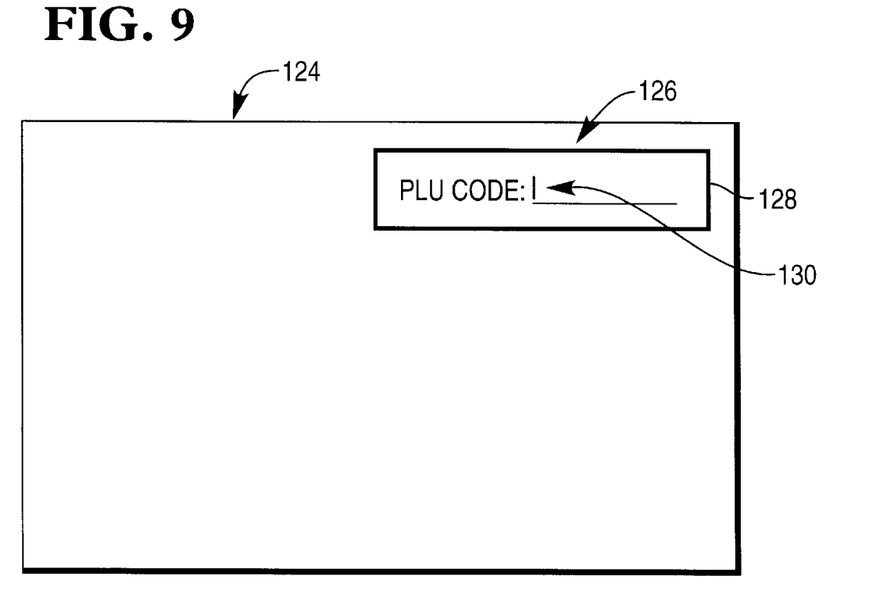
FIG. 9 illustrates the screen display shown in FIG. 8 after detecting the presence of an item on the scale device.

Referring now to FIG. 8, there is shown an exemplary screen display 124 prior to detecting the presence of an item on a scale device (block 92). The screen display 124 includes a PLU code field 126 where a PLU code may be entered by a user via the keypad 17, 47. Once weight is detected on the scale portion 24, 54, (block 92), the PLU code field 126 may be highlighted (block 122) by framing the PLU code field 126 with a visual indicator 128 as shown in FIG. 9.

Alternately, the PLU code field 126 may be highlighted by any other means such as bolding, underlining, flashing on and off, or changing the colors of the characters that form the PLU code field 126. Likewise, a blinking or non-blinking cursor 130, (FIG. 9) may be automatically positioned in the PLU code field 126 to facilitate data entry when weight is detected on the scale portion 24, 54. Once the relevant portion of the screen display is highlighted (step 122, FIG. 7) and the PLU code is entered in the field 126 (block 132), processing continues in the same manner as described above with regard to FIG. 4.

Thus, it should be appreciated that it is only necessary to automatically provide some type of a visual indicator which prompts the user to initiate a specific checkout procedure for the item resting on the scale portion 24, 54. It should also be appreciated that portions of the screen display 124 other than the PLU code field 126 may be highlighted. For instance, a portion of the screen display may be reserved for displaying an item menu similar to one of the item menus shown in FIGS. 5 and 6. In this case, the item menu, or at least a portion thereof, may be highlighted to prompt the user to initiate a specific procedure for checking out an item resting on the scale portion 24, 54.

What has been described above is a method and apparatus for checking out non-barcoded or un-scannable items at a self-checkout or assisted checkout station that improves the productivity or throughput of a checkout clerk, customer and/or checkout station by reducing the amount of time and effort required to process an un-scannable item through a checkout station. Productivity is improved by automatically providing a visual prompt to the user when an item is detected on a scale device. The visual prompt provides an indication to the user to initiate a specific checkout procedure for the item resting on the scale device.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

For example, it should be appreciated that the items listed on an item menu 98 (FIG. 5) may be selected on a periodic basis (e.g. daily, weekly, monthly, etc.) by store personnel based on sales volume records, inventory records, or purchase order records that are generated in the normal course of business. In addition, the items listed on an item menu 98 may be automatically and/or dynamically selected by an in-store accounting/inventory/sales system to reflect current sales volume trends. It should be appreciated that a dynamically created item menu could list un-scannable items whose sales volumes have temporarily increased due to events such as sales promotions, holidays, seasonal items etc. Also, the un-scannable items displayed on the item menus 98, 100 may be represented by icons or symbols other than alphabetic characters.

In addition, it should be appreciated that the above-described method and apparatus are useful in retail businesses other than supermarkets. For instance, such a method and apparatus could be used in stores where a substantial number of items for purchase are based on a weight of the item or items purchased (e.g. a candy store).

What is claimed is:

1. A method for checking out an item through a checkout station, comprising the steps of:

sensing when the item is positioned on a scale; and displaying a visual indication which prompts a user to initiate a specific keystroke operation in response to the sensing step, wherein the displaying step includes the step of displaying a menu having a plurality of items listed thereon.

2. The method of claim 1, wherein:

each of the plurality of items listed on the menu has an item number associated therewith, and the method includes the step of entering into a data input device an item number corresponding to the item positioned on the scale.

3. The method of claim 1, wherein:

each of the plurality of items listed on the menu has a touch area associated therewith, and the method includes the step of contacting a touch area associated with the item positioned on the scale.

4. The method of claim 1, wherein the displaying a menu step includes the step of:

listing the plurality of items in order based on a sales volume value associated with each of the plurality of items.

5. A checkout station, comprising:

a scale; and means for providing a visual indication which prompts a user to initiate a keystroke operation in response to an item being placed on the scale, wherein the visual indication means includes a menu having a plurality of items listed thereon.

6. The checkout station of claim 5, wherein:

the plurality of items listed on the menu each have a corresponding item number associated therewith, and the keystroke operation includes entering an item number corresponding with the item being placed on the scale.

7. The checkout station of claim 5, wherein:

the plurality of items listed on the menu each have a corresponding touch area associated therewith, and the keystroke operation includes contacting a touch area associated with the item being placed on the scale.

8. The checkout station of claim 5, wherein the plurality of items listed on the menu are ranked in order of a sales volume value associated with each of the plurality of items.

9. A checkout station, comprising:

a scale; and means for providing a visual indication which prompts a user to initiate a keystroke operation in response to an item being placed on the scale, wherein the visual indication means includes a highlighted portion of a display screen, and wherein the keystroke operation includes entering in the highlighted portion a PLU code associated with the item placed on the scale.

10. A checkout station, comprising:

a scale; and means for providing a visual indication which prompts a user to initiate a keystroke operation in response to an item being placed on the scale, wherein the scale includes means for generating a trigger signal in response to placing the item on the scale; and wherein the visual indication means includes a processing unit responsive to the trigger signal for displaying a menu on a display device associated with the checkout station.

\* \* \* \* \*